(12) United States Patent
Loewen et al.

(10) Patent No.: US 8,871,991 B2
(45) Date of Patent: Oct. 28, 2014

(54) METHOD FOR STABILIZING FUEL CONTAINING REACTIVE SODIUM METAL

(75) Inventors: Eric P. Loewen, Wilmington, NC (US); Brian S. Triplett, Wilmington, NC (US); Brett J. Dooies, Wilmington, NC (US)

(73) Assignee: GE-Hitachi Nuclear Energy Americas LLC, Wilmington, NC (US)

( * ) Notice: Subject to any disclaimer, the term of this patent is extended or adjusted under 35 U.S.C. 154(b) by 378 days.

(21) Appl. No.: 13/609,890

(22) Filed: Sep. 11, 2012

(65) Prior Publication Data

US 2014/0073829 A1 Mar. 13, 2014

(51) Int. Cl.
*G21F 9/00* (2006.01)

(52) U.S. Cl.
USPC .................. 588/1; 588/320; 588/403

(58) Field of Classification Search
USPC ............................. 588/1, 320, 403
See application file for complete search history.

(56) References Cited

U.S. PATENT DOCUMENTS

| | | |
|---|---|---|
| 3,984,345 A | 10/1976 | Heylen et al. |
| 4,607,778 A | 8/1986 | Oakley et al. |
| 5,732,363 A | 3/1998 | Suzuki et al. |
| 2009/0068075 A1 | 3/2009 | Takaoku et al. |

FOREIGN PATENT DOCUMENTS

| | | |
|---|---|---|
| DE | 2545031 A1 | 4/1977 |
| EP | 0854115 A1 | 7/1998 |
| GB | 1565822 A | 10/1980 |
| WO | 2010007236 A1 | 1/2010 |

OTHER PUBLICATIONS

PCT Search Report issued in connection with corresponding WO Patent Application No. PCT/US2013/054814 dated on Nov. 28, 2013.

*Primary Examiner* — Edward Johnson
(74) *Attorney, Agent, or Firm* — Harness, Dickey & Pierce, P.L.C.

(57) ABSTRACT

A method of stabilizing a fuel containing a reactive sodium metal may include puncturing a cladding of a fuel pin enclosing the fuel containing the reactive sodium metal to form an injection passage and an extraction passage. A reaction gas may be injected into the fuel pin through the injection passage to react with the reactive sodium metal to form a stable sodium compound. A ratio of a product gas and a remaining quantity of the reaction gas exiting the fuel pin through the extraction passage is subsequently measured, wherein the product gas is a reaction product of the reaction gas and the reactive sodium metal within the fuel pin. Once the measured ratio indicates that a reaction between the reaction gas and the reactive sodium metal is complete, the injection passage and the extraction passage are sealed so as to confine the stable sodium compound within the fuel pin.

12 Claims, 6 Drawing Sheets

METHOD FOR STABILIZING FUEL CONTAINING REACTIVE SODIUM METAL

BACKGROUND

1. Field

The present disclosure relates to methods and apparatuses for stabilizing spent fuel containing reactive sodium metal prior to disposal.

2. Description of Related Art

Sodium-bonded fuel offers safety, cost, and performance benefits when used in a sodium-cooled, fast spectrum nuclear power plant, such as the Power Reactor Innovative Small Module (PRISM) by GE Hitachi Nuclear Energy (GEH). If such a reactor is not operated in a recycling mode, then the spent sodium-bonded fuel requires direct geologic disposal. In particular, spent nuclear fuels containing sodium, such as fast spectrum, sodium-bonded HTGR fuels (e.g., EBR-II fuels), must undergo special processing prior to disposal in order to meet the applicable criteria of a waste acceptance site. Conventionally, such spent fuels required complete assembly, chopping, and electrometallurgical processing in order to be accepted by a pertinent site for disposal. However, the required special processing of such spent fuels in order to meet the applicable regulatory and repository requirements is relatively invasive, complex, and increases the costs of used fuel disposal.

SUMMARY

A method of stabilizing a fuel containing a reactive sodium metal may include puncturing a cladding of a fuel pin enclosing the fuel containing the reactive sodium metal to form an injection passage and an extraction passage. A reaction gas is injected into the fuel pin through the injection passage to react with the reactive sodium metal to form a stable sodium compound. A ratio of a product gas and a remaining quantity of the reaction gas exiting the fuel pin through the extraction passage is subsequently measured, wherein the product gas is a reaction product of the reaction gas and the reactive sodium metal within the fuel pin. The injection passage and the extraction passage are sealed so as to confine the stable sodium compound within the fuel pin once the measured ratio indicates that a reaction between the reaction gas and the reactive sodium metal is complete.

An apparatus for stabilizing a fuel containing a reactive sodium metal may include a tuyere structure configured to puncture a cladding of a fuel pin enclosing the fuel containing the reactive sodium metal. The tuyere structure may include an injection line and an extraction line. A reaction gas supply is connected to the injection line of the tuyere structure. The reaction gas supply is configured to supply a reaction gas to the fuel pin. A monitoring system is connected to the extraction line of the tuyere structure. The monitoring system is configured to measure a ratio of a product gas and a remaining quantity of the reaction gas exiting the fuel pin, wherein the product gas is a reaction product of the reaction gas and the reactive sodium metal within the fuel pin. A sealing system is connected to the monitoring system. The sealing system is configured to seal the fuel pin when the ratio measured by the monitoring system indicates that a reaction between the reaction gas and the reactive sodium metal is complete.

BRIEF DESCRIPTION OF THE DRAWINGS

The various features and advantages of the non-limiting embodiments herein may become more apparent upon review of the detailed description in conjunction with the accompanying drawings. The accompanying drawings are merely provided for illustrative purposes and should not be interpreted to limit the scope of the claims. The accompanying drawings are not to be considered as drawn to scale unless explicitly noted. For purposes of clarity, various dimensions of the drawings may have been exaggerated.

DETAILED DESCRIPTION

Figure 1:
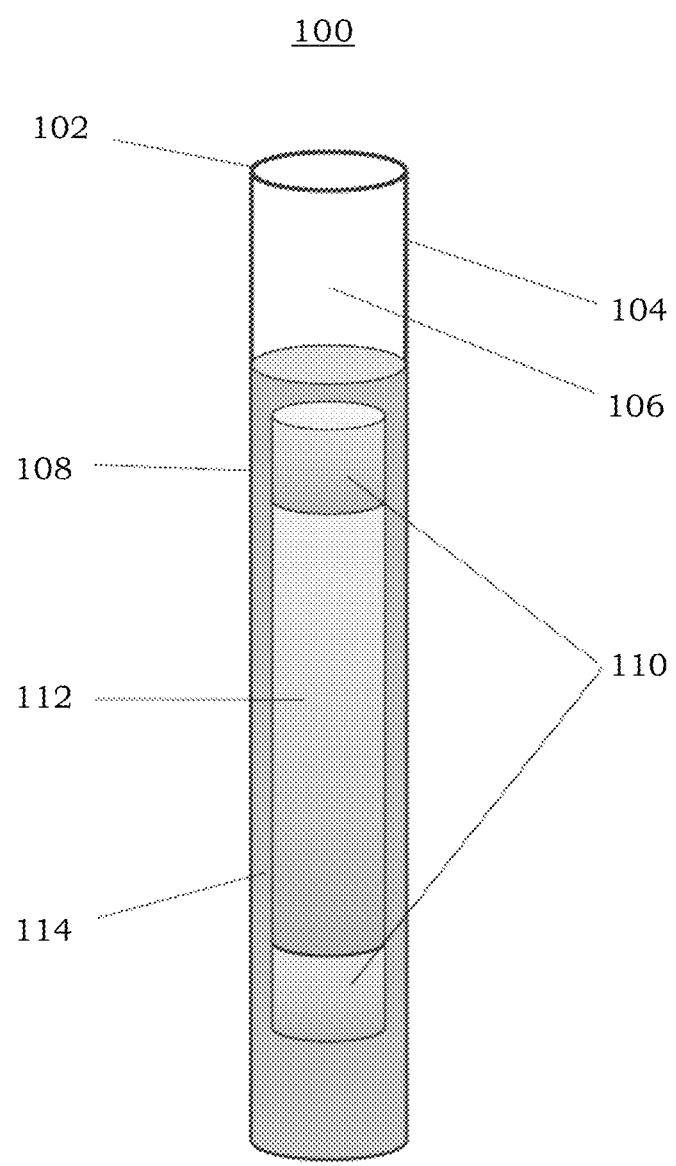
FIG. 1 is a side view of a fuel pin that includes a fuel containing a reactive sodium metal according to an example embodiment.

It should be understood that when an element or layer is referred to as being "on," "connected to," "coupled to," or "covering" another element or layer, it may be directly on, connected to, coupled to, or covering the other element or layer or intervening elements or layers may be present. In contrast, when an element is referred to as being "directly on," "directly connected to," or "directly coupled to" another element or layer, there are no intervening elements or layers present. Like numbers refer to like elements throughout the specification. As used herein, the term "and/or" includes any and all combinations of one or more of the associated listed items.

It should be understood that, although the terms first, second, third, etc. may be used herein to describe various elements, components, regions, layers and/or sections, these elements, components, regions, layers, and/or sections should not be limited by these terms. These terms are only used to distinguish one element, component, region, layer, or section from another region, layer, or section. Thus, a first element, component, region, layer, or section discussed below could be termed a second element, component, region, layer, or section without departing from the teachings of example embodiments.

Spatially relative terms (e.g., "beneath," "below," "lower," "above," "upper," and the like) may be used herein for ease of description to describe one element or feature's relationship to another element(s) or feature(s) as illustrated in the figures. It should be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the term "below" may encompass both an orientation of above and below. The device may be otherwise oriented (rotated 90 degrees or at other orientations) and the spatially relative descriptors used herein interpreted accordingly.

The terminology used herein is for the purpose of describing various embodiments only and is not intended to be limiting of example embodiments. As used herein, the singular forms "a," "an," and "the" are intended to include the plural forms as well, unless the context clearly indicates otherwise.

It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

Example embodiments are described herein with reference to cross-sectional illustrations that are schematic illustrations of idealized embodiments (and intermediate structures) of example embodiments. As such, variations from the shapes of the illustrations as a result, for example, of manufacturing techniques and/or tolerances, are to be expected. Thus, example embodiments should not be construed as limited to the shapes of regions illustrated herein but are to include deviations in shapes that result, for example, from manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of example embodiments.

Unless otherwise defined, all terms (including technical and scientific terms) used herein have the same meaning as commonly understood by one of ordinary skill in the art to which example embodiments belong. It will be further understood that terms, including those defined in commonly used dictionaries, should be interpreted as having a meaning that is consistent with their meaning in the context of the relevant art and will not be interpreted in an idealized or overly formal sense unless expressly so defined herein.

FIG. 1 is a side view of a fuel pin that includes a fuel containing a reactive sodium metal according to an example embodiment. Referring to FIG. 1, the fuel pin 100 includes a fuel 112 and a reflector/blanket 110 disposed on the ends of the fuel 112. As shown in FIG. 1, the fuel 112 and reflector/blanket 110 have a cylindrical shape, although example embodiments are not limited thereto. Sodium 114 surrounds the fuel 112 and reflector/blanket 110. When the fuel pin 100 has operated at a relatively high burn up rate, pores will form in the fuel 112. In such a case, the sodium 114 will also reside in the resulting pores within the fuel 112.

The sodium 114, fuel 112, and reflector/blanket 110 are encased by a cladding 108. As shown in FIG. 1, the cladding 108 has a cylindrical shape, although example embodiments are not limited thereto. The cladding 108 may be formed of an iron-based alloy but other suitable materials may also be used. The cladding 108 has a welded end 102 and a plenum region 104 adjacent to the welded end 102. Although FIG. 1 only shows the top of the fuel pin 100 as having the welded end 102, it should be understood that the bottom of the fuel pin 100 may also have a welded end. The plenum region 104 is defined by the inner surface of the cladding 108 above the sodium 114. The original plenum gases and fission product gases sealed within the cladding 108 are contained in the plenum region 104. The original plenum gases and fission product gases may be collectively referred to herein as plenum gases 106. The gases in the plenum region 104 may include both radioactive and non-radioactive gases.

Figure 2:
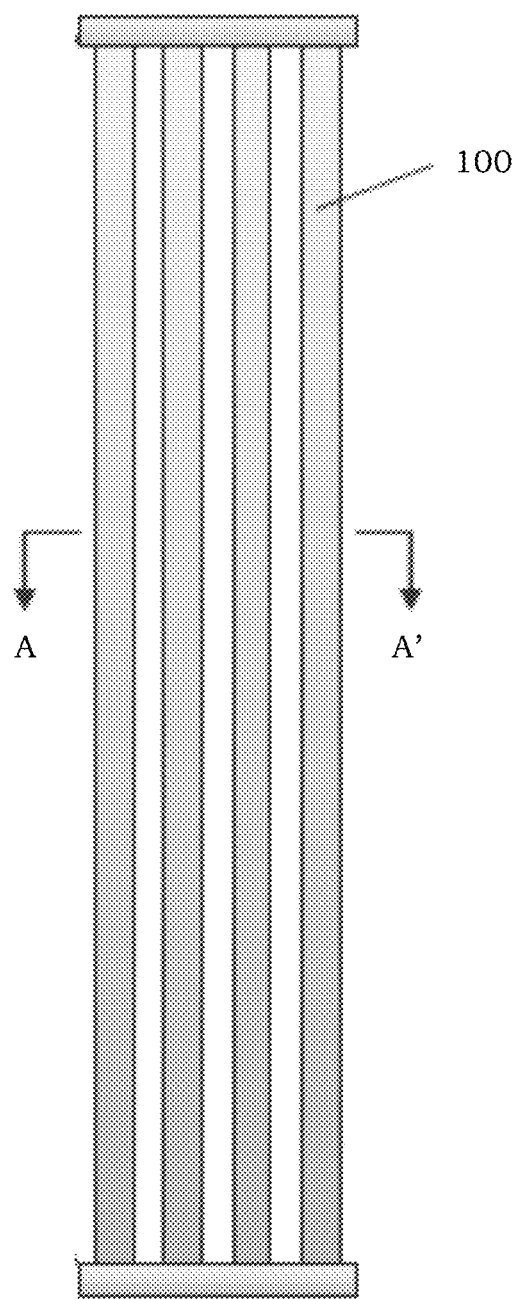
FIG. 2 is a side view of a fuel bundle including the fuel pin of FIG. 1.

FIG. 2 is a side view of a fuel bundle including the fuel pin of FIG. 1. Referring to FIG. 2, the fuel bundle 200 includes a plurality of fuel pins 100. Although only a row of four fuel pins 100 is shown in FIG. 2, it should be understood that example embodiments are not limited thereto. The fuel bundle 200 may be formed of an iron-based alloy or other suitable material.

Figure 3:
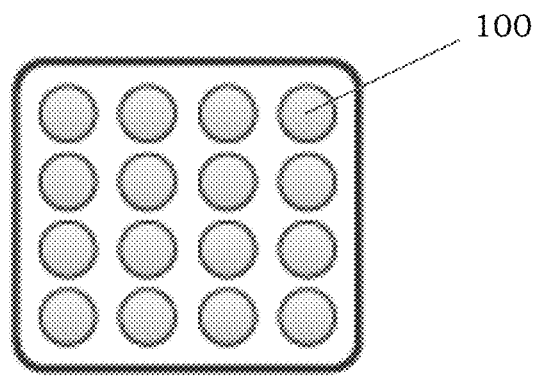
FIG. 3 is a cross-sectional view of the fuel bundle of FIG. 2 along line A-A'.

FIG. 3 is a cross-sectional view of the fuel bundle of FIG. 2 along line A-A'. Referring to FIG. 3, the fuel pins 100 are arranged in an array of sixteen fuel pins 100 within the fuel bundle 200. However, it should be understood that the fuel bundle 200 may contain more or less fuel pins 100 than that shown in FIG. 3. Also, the fuel bundle 200 may have a variety of shapes and is not limited to the square shape shown in FIG. 3.

Figure 4:
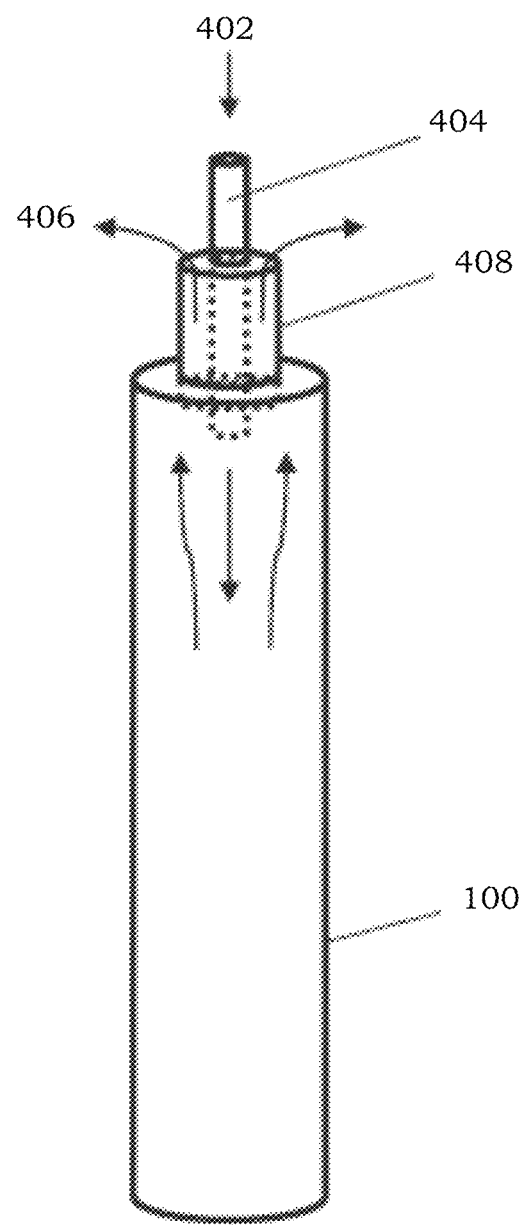
FIG. 4 is a side view of an apparatus for stabilizing a fuel within the fuel pin of FIG. 1.

FIG. 4 is a side view of an apparatus for stabilizing a fuel within the fuel pin of FIG. 1. Referring to FIG. 4, the apparatus for stabilizing a fuel containing a reactive sodium metal includes a tuyere structure configured to puncture the cladding 108 of the fuel pin 100 enclosing the fuel 112 and the sodium 114. In FIG. 4, the tuyere structure is shown as puncturing the planar, circular top surface of the welded end 102 of the fuel pin 100. However, it should be understood that the tuyere structure may be alternatively configured to puncture the curved side surface of the body portion of the fuel pin 100. Additionally, although the fuel pin 100 is shown as being vertically-oriented in FIG. 4, it should be understood that the fuel pin 100 may also be horizontally-oriented. In any event, the stabilization of the sodium 114 occurs in a self-contained and isolated environment within the confines of the fuel pin 100.

The tuyere structure includes an injection line 404 and an extraction line 408. As shown in FIG. 4, at least a portion of the injection line 404 is arranged within the extraction line 408. In a non-limiting embodiment, the injection line 404 is concentrically arranged within the extraction line 408. An inner surface of the injection line 404 defines an injection passage. The injection passage is configured to convey a reaction gas into the fuel pin 100. An outer surface of the injection line 404 and an inner surface of the extraction line 408 define an extraction passage. In particular, in a concentric arrangement, the annular space between the injection line 404 and the extraction line 408 defines the extraction passage. The extraction passage is configured to convey the product gas (from the reaction of the reaction gas and sodium 114), the inert gas, and/or the remaining quantity of the unreacted reaction gas as well as the plenum gases 106 (original plenum gases and fission product gases) from the fuel pin 100.

A reaction gas supply is connected to the injection line 404 of the tuyere structure. The reaction gas supply is configured to supply a reaction gas to the fuel pin 100 via the injection line 404. The reaction gas may be any gas that will react with the sodium 114 so as to reduce the chemical reactivity of the sodium 114 and form a thermodynamically stable product. For example, the reaction gas may be an organic gas or a halogen gas. In a non-limiting embodiment, the reaction gas may include carbon dioxide ($CO_2$), oxygen ($O_2$), methane ($CH_4$), and/or chlorine ($Cl_2$), although example embodiments are not limited thereto. Additionally, an inert gas supply may be connected to the injection line 404 of the tuyere structure. The inert gas supply may be configured to supply an inert gas to facilitate the introduction of the reaction gas into the fuel pin 100 via the injection line 404. The inert gas supply may also be configured to supply an inert gas to facilitate a purging of the gases within the fuel pin 100. The inert gas may include argon (Ar), nitrogen ($N_4$, and helium (He), although example embodiments are not limited thereto.

The reaction gas and/or inert gas introduced into the fuel pin 100 via the injection line 404 may be referred to generally herein as an injection gas 402. On the other hand, the product gas (from the reaction of the reaction gas and sodium 114), the inert gas, the unreacted reaction gas, and/or the plenum gases 106 (original plenum gases and fission product gases) removed from the fuel pin 100 via the extraction line 408 may be referred to generally herein as an extraction gas 406.

A vacuum may be connected to the extraction line 408 to facilitate a purging of the extraction gas 406 within the fuel pin 100. A filter may also be connected to the extraction line 408 to facilitate a capture of radioactive particles exiting the fuel pin 100. The radioactive particles may be captured for storage or for additional processing to isolate medical isotopes and/or commercially valuable isotopes (e.g., krypton-85).

A monitoring system is connected to the extraction line 408 of the tuyere structure. The monitoring system is configured to determine when the sodium 114 in the fuel pin 100 has fully or adequately reacted with the reaction gas to form a stable product. Such a determination is achieved by measuring a ratio of a product gas and a remaining quantity of the reaction gas exiting the fuel pin 100 through the extraction line 408. The product gas is a reaction product of the reaction gas and the sodium 114 within the fuel pin 100. For example, when carbon dioxide ($CO_2$) is used as the reaction gas, the reaction with the sodium (Na) 114 to produce carbon monoxide (CO) and sodium oxide ($Na_2O$) may be as described by the following Formula 1.

$$CO_2 + 2Na \rightarrow CO + Na_2O \quad (1)$$

The resulting CO product gas according to Formula 1 and any unreacted $CO_2$ reaction gas will exit the fuel pin 100 via the extraction line 408, while the stable $Na_2O$ product will remain in the fuel pin 100. In such a case, the monitoring system may include a $CO/CO_2$ monitor to measure the ratio of CO to $CO_2$ exiting the fuel pin 100 via the extraction line 408. Based on the known stoichiometric relationships in Formula 1, the known amount of $CO_2$ introduced into the fuel pin 100, and the known amount of sodium 114 in the fuel pin, the amount of reacted sodium can be calculated to determine whether the sodium 114 in the fuel pin 100 has been fully or adequately reacted with the $CO_2$ reaction gas to form the stable $Na_2O$ product. It should be understood that the reaction gases may be used individually or in combination. When a plurality of the reaction gases are used, the monitoring system may include a separate monitor for each reaction gas.

A sealing system is connected to the monitoring system. The sealing system is configured to seal the fuel pin 100 when the ratio measured by the monitoring system indicates that a reaction between the reaction gas and the sodium 114 is complete. Thus, stabilization of the sodium 114 may be achieved without having to even remove the cladding 108 of the fuel pin 100. Furthermore, the possibility of an uncontrolled chemical reaction occurring after disposal of the spent fuel may be reduced or prevented. Otherwise, in a situation where the sodium 114 has not been stabilized prior to disposal of the fuel pin 100, the subsequent intrusion of water (e.g., via corrosion of the cladding 108) and contact with the sodium 114 will result in the release of chemical energy and hydrogen gas, thereby presenting an explosion hazard.

Figure 5:
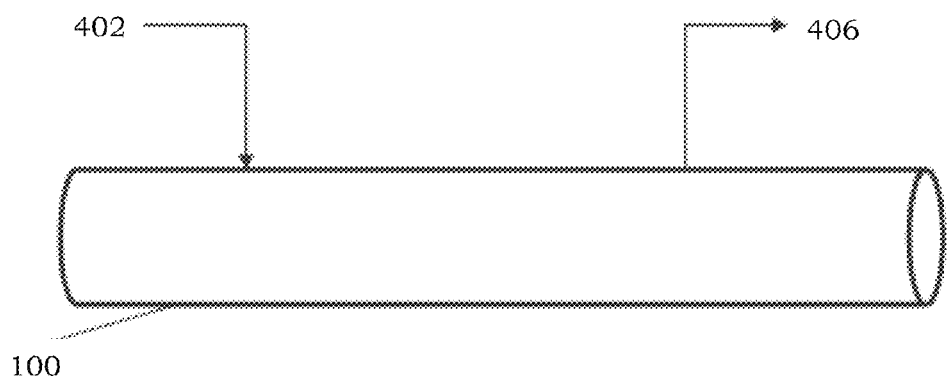
FIG. 5 is a side view of an alternate configuration of the apparatus of FIG. 4.

FIG. 5 is a side view of an alternate configuration of the apparatus of FIG. 4. Referring to FIG. 5, the tuyere structure is configured such that the injection line is disposed outside of the extraction line. As a result, the injection gas 402 is introduced at a first point that is spaced apart from a second point where the extraction gas 406 is removed. Although FIG. 5 shows the injection gas 402 and extraction gas 406 being respectively introduced and removed from the curved surface of the body portion of the fuel pin 100, it should be understood that the injection gas 402 and/or extraction gas 406 may also be respectively introduced and removed from the planar, circular end surface of the welded end 102 of the fuel pin 100.

Figure 6:
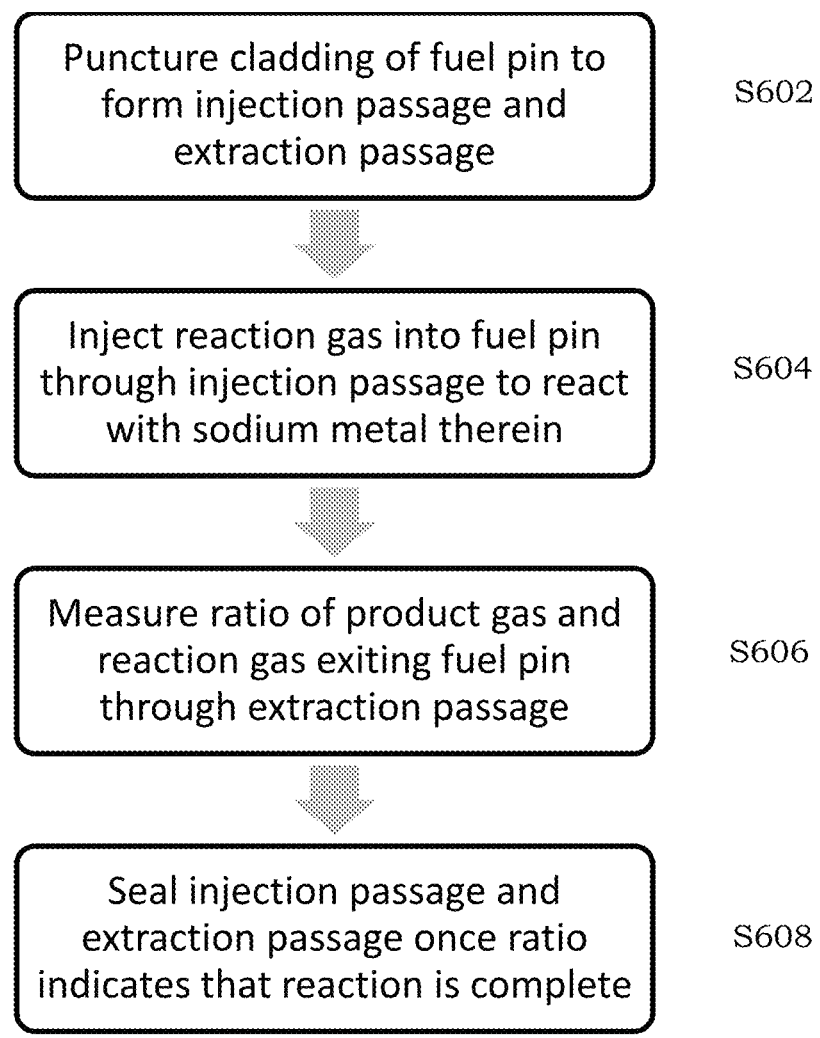
FIG. 6 is a flowchart of a method of stabilizing a fuel containing a reactive sodium metal according to an example embodiment.

FIG. 6 is a flowchart of a method of stabilizing a fuel containing a reactive sodium metal according to an example embodiment. Referring to S602 of FIG. 6, the method includes puncturing a cladding of a fuel pin enclosing the fuel containing the reactive sodium metal to form an injection passage and an extraction passage. Referring to S604 of FIG. 6, the method additionally includes injecting a reaction gas into the fuel pin through the injection passage to react with the reactive sodium metal to form a stable sodium compound. Referring to S606 of FIG. 6, the method subsequently includes measuring a ratio of a product gas and a remaining quantity of the reaction gas exiting the fuel pin through the extraction passage. The product gas is a reaction product of the reaction gas and the reactive sodium metal within the fuel pin. Referring to S608 of FIG. 6, the method further includes sealing the injection passage and, the extraction passage so as to confine the stable sodium compound within the fuel pin once the measured ratio indicates that a reaction between the reaction gas and the reactive sodium metal is complete.

The puncturing step of S602 may include orienting the fuel pin in a vertical position such that the injection passage and the extraction passage are formed on a planar end of the fuel pin. Alternatively, the puncturing step of S602 may include orienting the fuel pin in a horizontal or vertical position such that the injection passage and the extraction passage are formed on a curved surface of the fuel pin.

After the puncturing step of S602 and prior to the injecting step of S604, the method may further include venting an existing gas from the fuel pin. The venting an existing gas may include extracting original plenum gases and fission product gases from the fuel pin. The existing gas may include radioactive gas and/or a non-radioactive gas.

The injecting step of S604 may include introducing at least one of an oxygen-containing gas, a hydrocarbon gas, and a halogen gas as a reaction gas. For example, the injecting step of S604 may include introducing at least one of carbon dioxide ($CO_2$), oxygen ($O_2$), methane ($CH_4$), and chlorine ($Cl_2$) as the reaction gas. As a result of the reaction gas reacting with the sodium metal, at least one of $Na_2O$ and NaCl may be formed as a stable sodium product. However, it should be understood that the stable sodium product may vary based on the reaction gas used.

After the measuring step of S606 and prior to the sealing step of S608, the method may further include purging the fuel pin with an inert gas. The purging may include introducing at least one of argon, nitrogen, and helium.

The sealing step S608 may include closing the injection passage and the extraction passage by welding to confine the stable sodium product inside the fuel pin. However, other suitable means for sealing may also be used in addition to (or in lieu of) welding. As a result of the method and apparatus discussed herein, spent nuclear fuel containing reactive sodium can be stabilized without requiring a relatively complex process of complete disassembly and chemical processing of the disassembled parts. It should be understood that, although the disclosure herein focused on a spent fuel pin (containing sodium-bonded fuel) that has been removed from service, the principles and examples provided herein can also be applied to other sodium-containing products.

While a number of example embodiments have been disclosed herein, it should be understood that other variations may be possible. Such variations are not to be regarded as a departure from the spirit and scope of the present disclosure, and all such modifications as would be obvious to one skilled in the art are intended to be included within the scope of the following claims.

The invention claimed is:

1. A method of stabilizing a fuel containing a reactive sodium metal, comprising:
   puncturing a cladding of a fuel pin enclosing the fuel containing the reactive sodium metal to form an injection passage and an extraction passage;
   injecting a reaction gas into the fuel pin through the injection passage to react with the reactive sodium metal to form a stable sodium compound;
   measuring a ratio of a product gas and a remaining quantity of the reaction gas exiting the fuel pin through the extraction passage, the product gas being a reaction product of the reaction gas and the reactive sodium metal within the fuel pin; and
   sealing the injection passage and the extraction passage so as to confine the stable sodium compound within the fuel pin once the ratio indicates that a reaction between the reaction gas and the reactive sodium metal is complete.

2. The method of claim 1, wherein the puncturing includes orienting the fuel pin in a vertical position such that the injection passage and the extraction passage are formed on a planar end of the fuel pin.

3. The method of claim 1, wherein the puncturing includes orienting the fuel pin in a horizontal or vertical position such that the injection passage and the extraction passage are formed on a curved surface of the fuel pin.

4. The method of claim 1, wherein the injecting a reaction gas includes introducing at least one of an oxygen-containing gas and a halogen gas.

5. The method of claim 1, wherein the injecting a reaction gas includes introducing at least one of carbon dioxide ($CO_2$), oxygen ($O_2$), methane ($CH_4$), and chlorine ($Cl_2$).

6. The method of claim 1, wherein the injecting involves forming at least one of $Na_2O$ and NaCl from the reactive sodium metal.

7. The method of claim 1, wherein the sealing includes closing the injection passage and the extraction passage by welding.

8. The method of claim 1, further comprising:
   venting an existing gas from the fuel pin after the puncturing a cladding and prior to the injecting a reaction gas.

9. The method of claim 8, wherein the venting an existing gas includes extracting a radioactive gas from the fuel pin.

10. The method of claim 8, wherein the venting an existing gas includes removing fission product gases from the fuel pin.

11. The method of claim 1, further comprising:
   purging the fuel pin with an inert gas after the measuring a ratio and prior to the sealing the injection passage and the extraction passage.

12. The method of claim 11, wherein the purging includes introducing at least one of argon, nitrogen, and helium.

* * * * *